June 13, 1939.  A. M. REMINGTON  2,162,229
METHOD OF WELDING AND TEMPERING
Filed July 5, 1935   2 Sheets-Sheet 1

Inventor
Alfred M. Remington
By Roberts, Cushman & Woodbury
Attys.

Alfred M. Remington
Inventor

Patented June 13, 1939

2,162,229

UNITED STATES PATENT OFFICE 2,162,229

METHOD OF WELDING AND TEMPERING

Alfred M. Remington, Fitchburg, Mass., assignor to Simonds Saw and Steel Company, Fitchburg, Mass., a corporation of Massachusetts Application July 5, 1935, Serial No. 30,048

6 Claims. (Cl. 219—10)

This invention relates to an improved method of welding and tempering joints of steel and like metals, in which the temperatures involved tend to have a permanent effect upon the structure of the metal, and to the resulting welded joint.

It has heretofore been practiced to connect metals, the surfaces of which are to be joined, with a source of electric current, the gap between the surfaces constituting an interruption in the completion of the electric circuit. The surfaces are then advanced toward each other, until the electric potential between them spans the air gap and forms an electric arc. This, of course, creates a very high local temperature, and some oxidation of the metal occurs, which still further enhances the localized generation of heat,—and the opposed surfaces melt. They are then forced together so that the melted metal is extruded and both surfaces intimately and uniformly coalesce to form the weld or joint. The welded product is then air cooled and an electric current is again passed through both the joint and the area of metal surrounding the joint, so as to heat it by its own resistance, to relieve the strains which may have been set up by the initial high temperature of welding and the subsequent cooling.

The standard procedure which has heretofore been developed and meticulously followed in practice is as follows: The two ends of the metal parts to be joined are clamped, one in a fixed holder and one in a movable holder, the holders being arranged in alignment and so that the ends of the work project sufficiently to eliminate any possible interference or contact of the holders or clamps which also serve as terminals to the source of electric current. The current is then turned on from the switch, while the clamped ends of the work are still separated. The movable holder is then advanced toward the fixed holder, thus drawing an arc between the opposed metals and the metal melts. The operator continues to advance the movable clamp until fusion has taken place over the entire area of the surfaces to be joined, and until a ridge of molten metal has extruded throughout the margin of the weld. When it has reached this point, the current is cut off and the work is cooled. At this point, the weld therefore presents a ridge of fused metal, which is in the form of an irregular and more or less porous mass which may be considerably oxidized and also is extremely hard and brittle.

The operator then loosens the clamps and opens up the gap between them to about two inches (i. e., each about one inch away from each side of the welded joint), and then re-tightens the clamps upon the metal and again passes the current through the weld and adjacent areas of metal to heat to a cherry red or above the critical temperature (about 1500° F.) for the purpose of relieving strains and eliminating brittleness and refining the grain structure. It is then allowed to cool. It may be again reheated to a lower temperature, and this may be repeated.

Tests show that this two-inch section surrounding the welded joint is much weaker than the rest of the metal and that the metal is variable in this zone. In other words, it has heretofore been supposed that the metal of the weld, having been heated to a temperature above the critical temperature and cooled comparatively rapidly, would acquire a coarse, hard and brittle structure, and that the metal for about an inch adjacent to the weld on either side would also have been subjected to like conditions, due to conductivity of heat from the weld back into the body of the metal. It was further believed that by heating to such slightly lower temperatures, as above described, these conditions were relieved and a strengthening and refining of this portion of the metal was effected.

But such treatments are now found to have produced or at least left in the finished product wide variations in hardness throughout the entire area treated. That is, both the welded joint and the strip of metal about one inch wide on each side of the weld present wide variations. This may be demonstrated when the metal is tested at various points, for example, by the Rockwell hardness tester. It appears that the treatments described leave the inch-wide strip of metal on each side of the welded joint considerably weaker than either the welded metal of the joint itself or the rest of the metal of the bodies under treatment. This is manifested by subjecting the metal to a tensile stress across the welded joint and increasing up to the point of failure. The metal is found to be weaker and to rupture preferentially adjacent to the weld, but not within or across the welded joint nor in the unheated portions of the metal.

It is, therefore, an object of this invention to provide a method of welding metals,—and more particularly steel,—such as tool steels and typically in the form of thin shapes, such as saw blades, etc.,—whereby both the welded joint and the entire zone of metal in which the joint occurs will be both strong and of substantially uniform structure, as evidenced, for example, by presenting but slight variations in hardness, if any. It is also an object to preserve the shape of the bodies which are being welded together. Other objects will appear from the following disclosure.

As above pointed out, the welding operations as heretofore practiced in the art, while making a well united weld, do not yield a uniform structure, nor one which is of a reliably high degree of tensile strength. It is now found that one source of such non-uniformity may be attributed to the fact that the heating of the metal (especially after spacing the clamps apart) is dependent upon the electrical resistance and distribution of the electric current through the strip of metal between the clamps, which is very variable. The contacts between the clamps and the metal, the exact distance apart, at which they are placed, the cross-section of the work, the electrical resistance of the latter and the variations in resistance, due to the different structure of the welded joint and adjacent areas, all introduce factors of variability which are effective upon the rate of heating of the metal. Moreover, the intervening surfaces of the metal (between contacts with the clamps) are exposed and dissipate heat, which also mitigates against uniform or regulated heating effect. As a result, the temperatures attained also fluctuate. Moreover, the temperatures heretofore employed were sufficient to have a decided influence upon the entire area between the clamps and, being exposed to the air at the same time, these areas of the metal presented a much more variable distribution of heating and cooling effects upon this area than the original welding heat.

By the procedure of the present invention, the metal bodies to be joined together are secured by clamps which contact with and grip the metal, as closely as possible to the surfaces to be welded. These clamps are adapted to carry an electric current and are suitably connected to a source of differential electrical potential, or to a current which may be completed through a switch, except for the air space between the surfaces themselves. The surfaces are preferably clean and so shaped as to be at least approximately complementary to each other. They may advantageously be made accurately complemental to each other, though this is not essential for obtaining good results. The switch is then thrown and the surfaces gradually made to approach each other. When the air gap is sufficiently reduced, an arc will be drawn between the two surfaces, which will thereupon be rapidly heated to a high temperature and melt. The surfaces are promptly brought closer together and finally actually contacted. They may then also be subjected to compressive pressure. This tends to expel entrained gases, impurities, etc., if present, and also some of the molten metal from both surfaces. If the opposed surfaces are smooth and so shaped as to conform perfectly to each other, however, it is now found that it may in some cases be feasible and desirable to bring them into contact with very little or no pressure, and thereby avoid the lateral extrusion of the molten metal. In such accurate union, the two fluid or liquid metals simply merge spontaneously and form a uniform and continuous weld upon contact, which upon solidification may be made practically perfectly continuous and at the same time leaves the structure of the ends undisturbed and homogeneously unified.

The weld is now complete, but if the weld were kept at or near this welding temperature (which is far above the critical temperature) too long it would tend to crystallize, forming a coarse structure. It is, therefore, cooled as soon as the weld is properly formed. This may be done conveniently (and fairly rapidly) by breaking the current and simply removing the clamps. By so doing, a fine grained structure, of a high degree of hardness, is developed, especially in the molten portion of the weld. It likewise tends to be brittle and rather weak. The development of these characteristics may penetrate into the adjacent metal, but more or less irregularly depending upon the time and temperature of the welding operation, the time during which it is held in the clamps after the current is shut off, and the specific heat and conductivity along the welded joint and laterally therefrom into the unmelted zones of the adjacent metal. To check such dissipation of the effect of the molten weld, prompt cooling is helpful. But if the melting operation is very brief, so that these effects are minimized, as above indicated, the subsequent cooling may be similarly modified.

The welded joint is next secured between clamps or molds, adapted to receive and closely fit over the surfaces of the metal on both sides of the welded joint, and preferably also over the welded joint itself, thus excluding air, and subjected to both compressive pressure and to an externally developed temperature sufficient to temper and/or toughen the metal. This temperature is uniformly applied to the weld and to the entire area surrounding the weld and is maintained for a sufficient time for the heating effect to permeate and diffuse throughout the heat affected zone and bring it uniformly to the desired temperature. In this way, strains are relieved without new strains being set up, and the desired crystalline structure of the metal may be developed, but at a temperature preferably below the critical or annealing temperature. In other words, the metal structure will develop radially from the fine grained crystal nuclei at the uniform temperature impressed upon it from without and independent of variations in electrical conductivity, heat losses, etc. In general, such heat treatment (in order to provide a structure like that of the adjacent portions or remainder of the parts which have been joined by the welding and which may already have been given a previous hardening and temperature treatment) may be effected at temperatures and for periods of time corresponding to the original hardening and tempering treatment of the whole. In this way the welded joint and surrounding areas are induced to re-acquire their original characteristics which were imparted to them before the welding operation, and thus to conform to the structure, hardness, etc., which are desired for the whole. The metal may then be removed from the clamps and allowed to cool down,—or the cooling may be effected while it is held in the clamps, as may prove necessary or desirable in any given case. Preferably such cooling is also similar to that effected during and after the original heat treatment.

The welded article, as thus made, may now have the fin of extruded metal (if any) removed easily (because it is not now so hard as after the initial cooling, especially when rapid air-cooling has been effected) and the joint will present a structure which is continuous and almost identical with the adjacent portions of the welded bodies. Upon microscopic examination, it will be manifest that substantially the same kind of crystal structure has been developed both in the welded (i. e., melted) zone and in the body portion of the metals away from the weld and away from the heated portions. Crystallinity may be slightly greater in the weld, but in respect of the number of crystal nuclei rather than in grain size or in the type of grain structure. This may be due to the greater degree of fluidity which it has attained, by virtue of the welding temperature within the weld and which has not been attained in the surrounding structure.

Upon testing by magnetizing and sprinkling with iron filings, it is found that the entire area—welded joint and non-welded portions—are substantially uniform in respect of magnetic flux. When some of the molten metal has been extruded from the welded joint, very fine marginal lines, defining the planes between the melted and flowing metal and the non-melted and non-flowing metal portions on either side of the welded joint, may appear, but only as a very thin, fine line of marked magnetic flux. This is attributed to the mechanical flow lines of the molten metal along the margins of non-melted metal—as it was extruded under the compressive pressure of the union—and not to the heat treatment per se or different crystal grain formation or structure such as is formed by differential heat treatment.

Upon subjecting the welded metal to a tensile strength test across the weld, it is found that the tensile strength value is not only increased about 50% above the tensile strength of similar metal articles which have been welded in accordance with the prior art, but that the rupture, upon ultimate failure, takes place not in the main body of the article in portions adjacent to the weld but in the weld itself. Accordingly, it shows that the strength developed in the metal bodies to be joined are not adversely affected but that they are preserved and that the slight mechanical disruption (due, perhaps, to the fluid flowage of the molten metal transversely to the weld as the molten surfaces are pressed together) apparently has a greater weakening effect than the heat treatment. This may be reduced by reducing the degree to which the molten surfaces are pressed together and the extent to which the molten metal is extruded therefrom or disturbed.

A typical example of the practical application of the invention will be described for welding the ends of steel belt knives or band saws, with reference to the accompanying drawings, in which:

Figs. 7 and 8 are microphotographs of the grain structure inside and outside of the weld, respectively, shown in Fig. 5.

The belt knife or band saw has been already hardened, by heating to or slightly above the critical temperature and then passing through a quenching medium such as oil, and subsequently toughened and tempered by mechanical working and heating, in customary ways, appropriate to the steel used and adapted to render it suitable for the purposes which the product is intended to serve as a whole.

Figure 1:
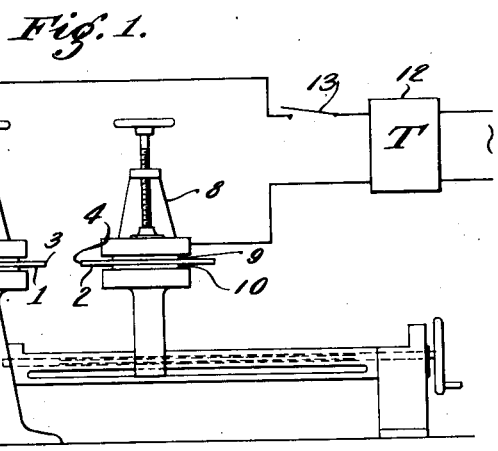
Fig. 1 is a front elevation in perspective of the apparatus for welding.
Figure 3:
Fig. 3 is an enlarged view of the welded joint thereon.

Then referring to the drawings, in Fig. 1 the ends 1 and 2 of the belt or band are preferably cleaned and trued, and then positioned so that their end surfaces 3 and 4 are substantially parallel. The end 1 is placed in the fixed clamp 5 and secured between flat, copper jaws 6 and 7 which engage the saw with a snug contact and as closely adjacent and parallel to its end surface 3 as is practically possible. The other end 2 is similarly secured in a movable clamp 8 having copper jaws 9 and 10. The jaws 6, 7, 9 and 10 form intimate electrical contact with the ends of the saw blade secured thereby and are connected to a suitable source of electric current, such as transformer 12, through a switch 13.

The switch is now closed, and the movable clamp 8 moved slowly to bring the surfaces 3 and 4 together. An arc is struck between them, the surfaces are fused, and as this fusion progresses throughout the surfaces (or immediately thereafter) they are brought together. There is a tendency to compress the surfaces together more firmly than is necessary, to insure the expulsion of gases, slag, etc., as well as oxides which may be formed. It is desirable not to overdo such compression beyond the point of forming a uniform fusion or weld of the soft metal surfaces, for the reasons indicated above. If the surfaces are so shaped as to complement each other a comparatively light contact is sufficient and lateral extrusion of melted metal may be but slight or practically avoided altogether.

Figure 2:
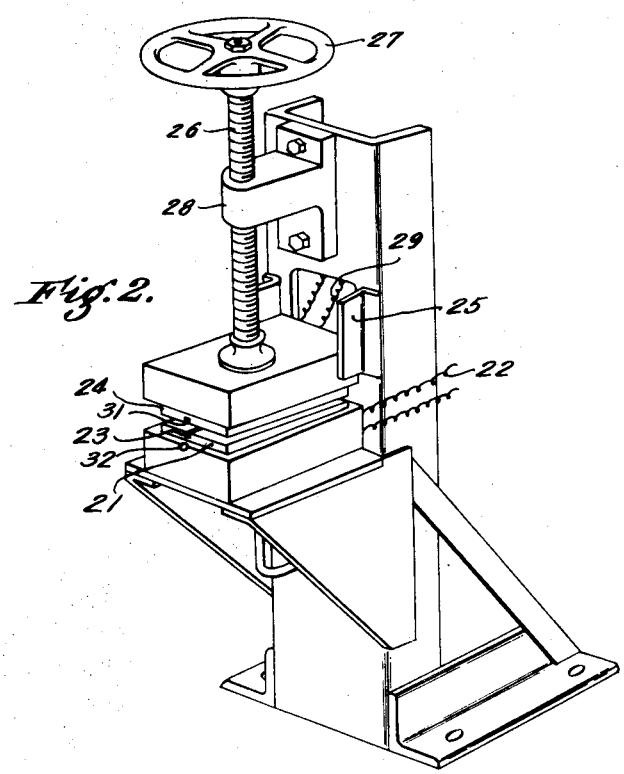
Fig. 2 is a front elevation of the apparatus for subsequent heat treatment.

The current is then shut off and the saw blade withdrawn from the clamps. It naturally cools quickly upon exposure to the air. It may be allowed to cool thoroughly or may be promptly placed in the apparatus shown in Fig. 2. This consists of a single clamping device, having a base plate 21 carrying an electric heating coil 22 and having a groove in its upper face 23. Opposed to the base plate 21 is an upper movable plate 24 slidably mounted in a vertical guideway 25 and actuated by a pressure screw 26 with a handwheel 27,—the screw thread passing through a boss 28. The plate 24 has an electrical heating resistance unit 29 therein, and the under face of the plate 24 carries a groove 31, opposite to the groove 23 in the lower plate.

Figure 5:
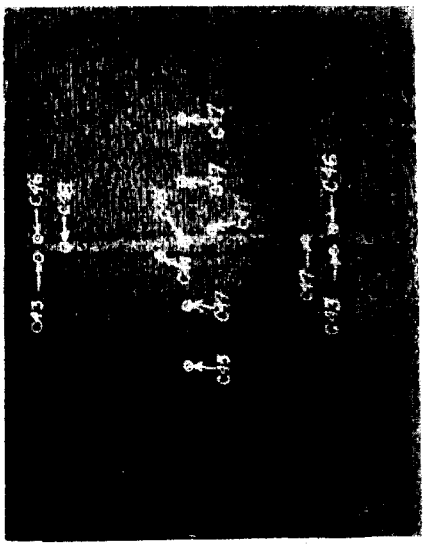
Figs. 5 and 6 are photographic views of the arrangement of iron filings (with degrees of hardness also noted thereon as determined by the Rockwell hardness tester) across joints welded in accordance with this invention and composed of a chrome-nickel, .70 to .72% carbon steel.
Figure 7:
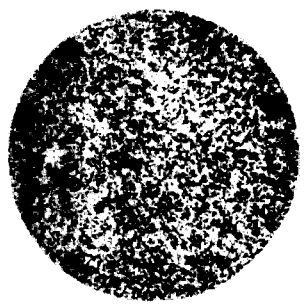
Figure 6:
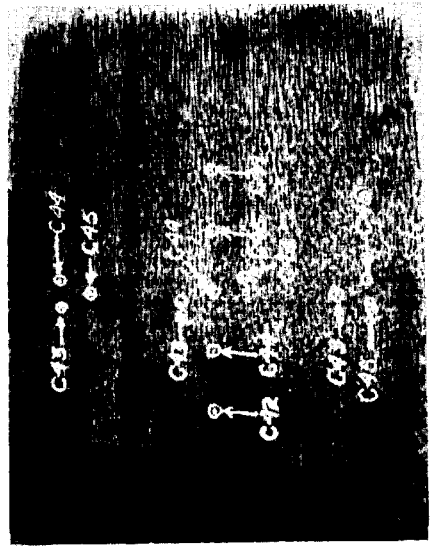

The welded saw blade is now placed between the plates 21 and 24 with the fins of extruded metal 14 and 15, if present, received by the grooves 23 and 31, respectively. The plate 24 is then lowered upon the saw blade by actuating the handwheel 27, until the blade is firmly held, and preferably subjected to some pressure. The amount of pressure applied will depend upon the stiffness of the blade, the thickness, width, etc. An electric current is (now or previously) passed through the resistance coils in both plates to heat the same and the saw blade between them to the required temperature, as indicated by the usual pyrometric means, through the thermo-couple 32, embedded in the lower plate closely adjacent to the surface and preferably near to the groove 23. The temperature is raised, held, and lowered for suitable periods of time to effect the desired heat treatment of the blade,—consonant with its original heat treatment. For example,— with a saw blade of .72% chrome-nickel-steel, 1/32" thick and 3½" wide, it was found that a period of 10 minutes heating to 925-950° F., holding at this temperature for fifteen minutes and cooling at room temperature after withdrawing from the forms gave a welded joint, having a tensile strength of 197,000 lbs. per square inch and, by the Rockwell hardness tester, the degrees of hardness indicated by the numerals in Fig. 5 and a microscopic grain structure as illustrated in Figs. 7 and 8. It also showed a marked improvement in bending tests and improved uniformity and reliability generally. It will be observed that the temperatures employed are those of tempering rather than annealing temperatures. It has been noted that the higher the temperature of treatment, the lower the hardness (as shown on the Rockwell hardness tester) and vice versa, other conditions remaining the same. The temperatures heretofore employed, being carried to a visible redness in order to be observable, have frequently exceeded the annealing or critical temperature with deleterious results. In short, hardness, temper, strength, and structure of the sharply heated and fused weld or joint are adjusted by the present procedure to correspond to that of the surrounding metal, without altering the desired characteristics of the latter which consequently may be already fully developed prior to the heat treatment.

In other words, the developed structure of the band saw as a whole is retained, and uniformity of the blade preserved,—as indicated by the ultimate rupture occurring in the weld itself rather, than in the adjacent metal. But the fact of this rupture, occurring only at the maximum of tensile strength for steel—namely 197,000 lbs. per square inch, indicates that the weld is not mechanically nor structurally weak. Moreover, since all of the portions of the blade which are heated in the welding operation are free from excessive hardness and also free from variations in the degree of hardness from place to place, it proves that the weld and adjacent areas have been accurately adjusted to correspond to the rest of the steel saw blade, which indicates an optimum of construction characteristics and reliability.

Figure 4:
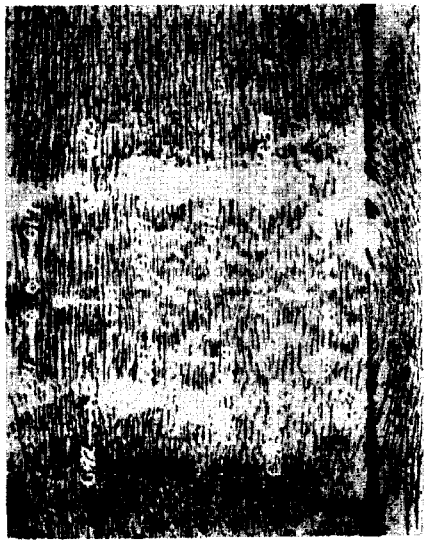
Fig. 4 is a photographic view of the arrangement of iron filings (with degrees of hardness also noted thereon, as determined by the Rockwell hardness tester) across a joint, welded in accordance with the prior art and composed of a chrome-nickel, .70 to .72% carbon steel.
Figure 6:
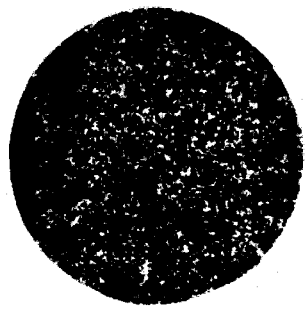

In general, it may be pointed out that by the procedure of this invention the molten metal of the weld need not be held at the high temperatures of welding so long as heretofore and consequently the metal therein is not subject to the development of so coarse a crystalline structure nor to the degree of heat transmission and consequent heat effect upon the metal adjacent to the molten and fused surface portions. Moreover, upon cooling from this lower or less distributed temperature condition, the hardening and embrittling effect of cooling is reduced, at the same time the formation of primary troostite may be induced in the softened part of the weld, as by controlling the rate and degree of cooling. Upon reheating in the externally heated clamps, as above described, the development of secondary troostite and subsequently conversion of troostite into sorbite is effected which is highly desirable if not essential to a thoroughly satisfactory product. This development may be accurately controlled by the time and temperature combination of the heating, holding and cooling stages of the reheating treatment, to effect the desired tempering and toughening of the welded joint, to a degree corresponding to that already developed in the main body portions of the ends (and of the rest) of the saw blades and also to effect the structural homogeneity of the fused metal in the welded joint with the adjacent metal which has not been melted in the welding operation. As indicated in the photomicrographs of Figs. 7 and 8, the crystal structure in the weld is substantially identical with the crystal structure outside of the weld, and the hardness (Fig. 5) presenting only normal variations throughout the welded joint, the margins, and the main body of the surrounding metal (and similarly in Fig. 6) in contrast to the variations shown in Fig. 4.

I claim:

1. A method of welding thin steel sheets and bands, comprising as steps, drawing an arc between the surfaces to be welded, bringing said surfaces into intimate fusing contact with each other, thereafter securing the welded joint firmly, and subjecting the welded joint to a uniform tempering heat treatment throughout the weld and adjacent portions of the metal at a temperature below the fusion or annealing temperature of the metal.

2. A method of welding thin steel sheets and bands, comprising as steps, drawing an arc between the surfaces to be welded, pressing said surfaces into intimate fusing contact with each other, cooling, securing the welded joint under pressure, and subjecting the welded joint to a tempering heat treatment substantially uniform throughout the weld and adjacent portions of the metal.

3. A method of welding thin steel sheets and bands, comprising as steps, melting the surfaces of the metals to be joined, bringing the same into uniform fusion contact with each other, cooling to solidify the same and thereafter subjecting the welded joint and area adjacent thereto to compression, while heating substantially uniformly to a tempering temperature.

4. A method of welding thin steel sheets and bands, comprising as steps, melting the surfaces of the metals to be joined, bringing the same into uniform fusion contact with each other, cooling to solidify the same and thereafter subjecting the welded joint and area adjacent thereto to compression, while subjecting substantially uniformly to a temperature of approximately 950° F.

5. A method of welding thin steel sheets and bands, comprising as steps, fusing the surfaces to be welded, pressing the melted surfaces into an intimately fused contact with each other, securing the welded joint firmly and subjecting the welded joint to a uniform tempering treatment throughout the weld and adjacent portions of the welded steel body.

6. A method of welding steel belts or bands, comprising as steps, heating to the critical temperature, quenching, toughening and hardening, and thereafter welding the ends by heating to a melting temperature, bringing the same into fusion contact with each other, cooling to solidify the same and thereafter subjecting the welded joint and area adjacent thereto to compression while heating substantially uniformly to a tempering temperature for the steel.

ALFRED M. REMINGTON.